Sept. 19, 1967 W. ULRICH 3,343,139

ABBREVIATED MASK INSTRUCTIONS FOR A DIGITAL DATA PROCESSOR

Filed Oct. 7, 1964 4 Sheets-Sheet 1

INVENTOR
W. ULRICH
BY John C Albrecht
ATTORNEY

ABBREVIATED MASK INSTRUCTIONS FOR A DIGITAL DATA PROCESSOR

Filed Oct. 7, 1964 4 Sheets-Sheet 3

Sept. 19, 1967 W. ULRICH 3,343,139

ABBREVIATED MASK INSTRUCTIONS FOR A DIGITAL DATA PROCESSOR

Filed Oct. 7, 1964 4 Sheets-Sheet 4

| 22 | 21 | 20 | 19 | 18 | 17 | 16 | ORDER |
|---|---|---|---|---|---|---|---|
| 0 | 0 | 0 | INDEX REGISTER | | DESTINATION REGISTER | | (UNMASKED) READ |
| 0 | 0 | 1 | INDEX REGISTER | | DESTINATION REGISTER | | (MASKED) READ |
| 0 | 1 | 0 | INDEX REGISTER | | SOURCE REGISTER | | WRITE |
| 0 | 1 | 1 | INDEX REGISTER | | — | | TRANSFER |
| 1 | 0 | 0 | INDEX REGISTER | | DESTINATION REGISTER | | (UNMASKED) REGISTER-TO-REGISTER |
| 1 | 0 | 1 | INDEX REGISTER | | DESTINATION REGISTER | | (MASKED) REGISTER-TO-REGISTER |
| | | | | | | | |
| 1 | 1 | 0 | INDEX REGISTER | | DESTINATION REGISTER | | ABBREVIATED MASK - READ |
| 1 | 1 | 1 | INDEX REGISTER | | DESTINATION REGISTER | | ABBREVIATED MASK-REGISTER-TO-REGISTER |

FIG. 4

United States Patent Office 3,343,139
Patented Sept. 19, 1967

3,343,139
ABBREVIATED MASK INSTRUCTIONS FOR A DIGITAL DATA PROCESSOR

Werner Ulrich, Colts Neck, N.J., assignor to Bell Telephone Laboratories, Incorporated, New York, N.Y., a corporation of New York Filed Oct. 7, 1964, Ser. No. 402,311
6 Claims. (Cl. 340—172.5)

ABSTRACT OF THE DISCLOSURE

A data processor is provided with circuitry which permits it to generate a mask word and to mask an operand word responsive to a single abbreviated mask instruction. When this instruction is detected, the normal transmission to the index adder of all of the bits of the constant part of the instruction is inhibited. Part of the constant bits are employed to form a sum word with the contents of a register specified in the order. The remaining bits of the constant part are translated into the mask word which is entered into the masking register. A masking circuit then performs the masking function utilizing the contents of the masking register, the sum word and the operand word which may be taken from memory at a location indicated by the sum word.

Figure 1:
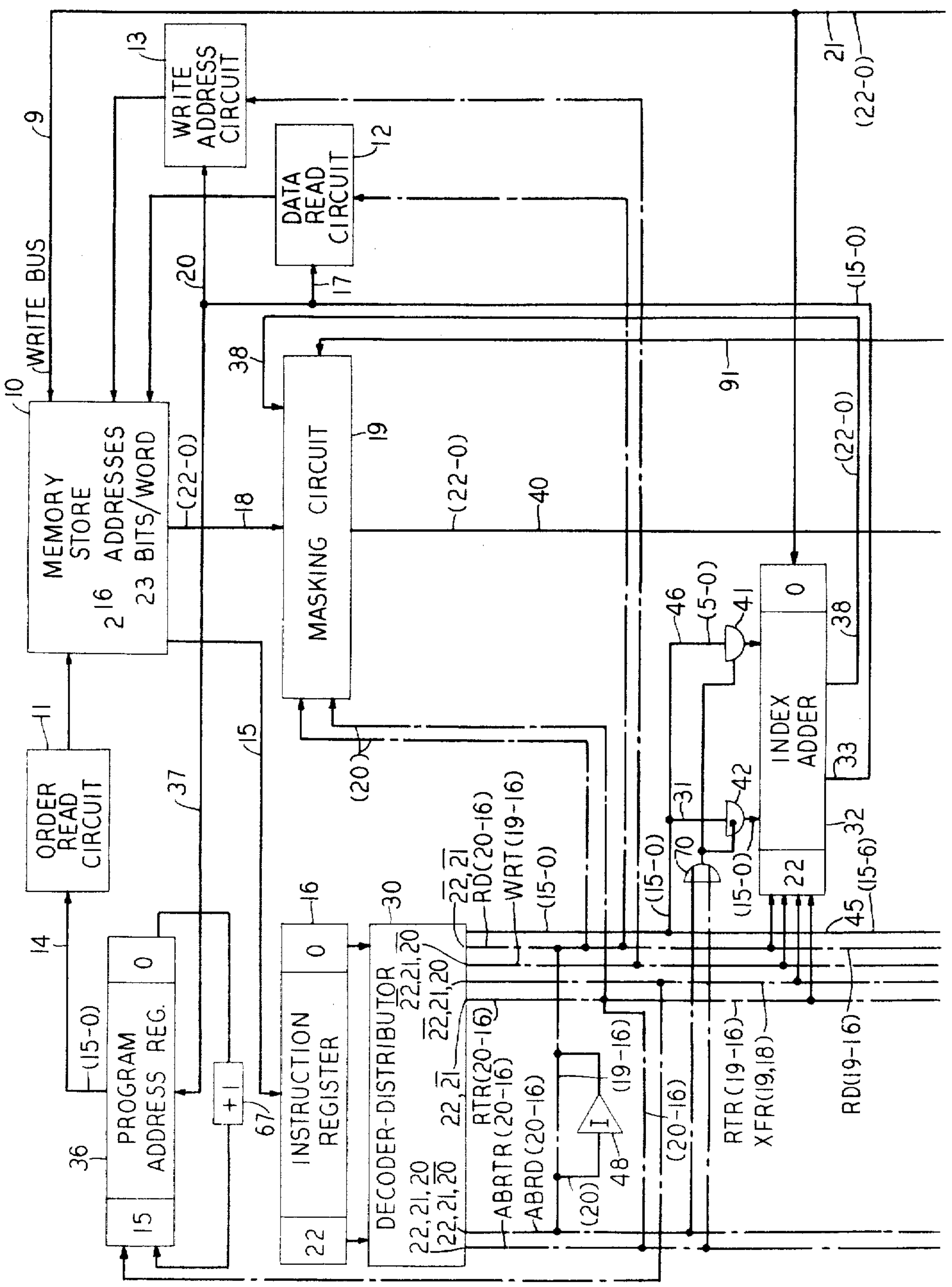

This invention relates to data processing equipment and more particularly to circuits for increasing processing capability by use of an abbreviated mask instruction.

In many data processing machines an insertion mask option is available on various types of orders. A mask blocks the transmission of selected bits in a word being transferred from one part of the machine to another. For example, the word 101011 might be transferred from a memory store to a register. In the course of the transfer, the word passes through a masking circuit. Suppore the mask in the masking circuit is the word 011110. Each bit in the mask is associated with a corresponding bit in the word. If the mask bit is a 1 the corresponding bit of the word is allowed to pass through the masking circuit to be written into the register. If the mask bit is a 0 the corresponding bit in the word is blocked from passing through the masking circuit to the register. Thus, in the example selected, the only bits in the word which are passed through the masking circuit to the register are the four center bits 0101. The two outer bits in the word are blocked. Suppose the register originally contained the word 111000. The four bits coming through the masking circuit are written into the four center stages of the register. The two outer stages of the register are unaffected because no bits are passed through the masking circuit to be written into these stages. Thus, the final word appearing in the register after the masking operation is 101010. A mask option is often highly advantageous because it allows the writing of bits into only a portion of a register or a memory location. This is particularly useful in a word organized system, many of whose words contain several items of information that must sometimes be treated independently.

The mask option may be provided in a particular machine for a variety of orders. For example, an order specifying that a word in a memory store location should be transferred to a register might include the mask option, in which case the word would pass through the masking circuit on its way to the register. Similarly, an order specifying the transfer of a word from one register to another might include the mask option, in which case the word would once again be masked before being written into the latter register. A "write" order which controls the writing of a register word into a memory store location might also include a mask option; only some of the bits in the memory store location would be affected during the execution of the write order.

In all of these situations, however, the mask word must be available when the order including the mask option is executed. The mask word may be stored in a masking register which is connected to the masking circuit. Before an order which includes the mask option may be executed, the mask word must appear in the masking register. The mask word often comes from the memory store. In the prior art it has generally been necessary to provide two successive orders whenever a mask option is to be included in the second order. The first order transfers the mask word from the memory store to the masking register. The second order, which for example may be to read another word from the memory store through the masking circuit to a specified register, may include the mask option because the mask word is already contained in the masking register.

It is a general object of my invention to provide a mask option on a variety of orders for a data processor without requiring the execution of a prior order to derive the mask word.

For an appreciation of the invention, it is first necessary to consider why two successive orders are generally required in prior art machines whenever the second order is to include the mask option. Conisder a machine in which all words are 23 bits in length. A single memory store may be provided in which are stored both instruction and data words, instruction words having the same length as data words. The length of any mask word stored in the memory is of necessity 23 bits because the mask word must include one bit for each digit in the data word to be masked. An instruction word cannot include the mask if the mask option is required. If the instruction word did include the full mask, there would be no bits left to specify the order itself. Consequently, an instruction word merely includes a direction to mask if the option is wanted. The mask itself is priorly stored in the masking register. The executions of two orders are required because there are an insufficient number of bit positions in an instruction word to include a full mask of 23 bits and the order itself.

There are some machines in which data words and instruction words are not of the same length. While data words may be 23 bits in length, instruction words may be longer. But even in these machines, it may be possible to include a mask in the instruction word itself. Suppose instruction words are 27 bits in length, rather than only 23. If at least seven bits are required to specify an order, it is apparent that only 20 bits remain in the instruction word for other purposes. Again, the mask cannot be carried in the instruction word itself because there are not 23 bits left over in which the mask could be written. It is still necessary to provide a two-instruction sequence whenever the mask option is required. A first order stores the mask in the masking register, and a second order includes a direction to mask, using the previously stored mask, in executing the specified order.

Each instruction word usually includes a number of bits for controlling the order to be executed, and a number of bits which represent a constant. The constant is used in different ways in the execution of different orders. As has just been described, there are usually an insufficient number of bits in the constant to represent a mask, even were the constant part of the instruction word to be used in this manner. In accordance with an aspect of my invention, however, a full mask is represented by bits in the constant part of an instruction word. In fact, the full mask is represented in so few a number of bits in the constant that it is still possible to include in the constant a series of bits, although fewer than usual, to be used in the execution of the specified order in the normal manner.

The invention is predicated on the observation that most masks are of a particular form. The mask consists of all 0's except for one sequence of successive bits which are 1's. Thus in a machine in which all data words are only six bits in length, typical masks might be 111100, 011000, and 001111. Upon examination of these typical mask words, it becomes apparent that a mask may be described by merely specifying the first position in the word which contains a 1, and the last position in the word which contains a 1. Thus the mask 001110 may be defined by specifying that the second bit of the word is the first bit which is a 1, and that the fourth bit in the word is the last which is a 1.

Consider now a machine in which all data words and all instruction words are 23 bits in length. All instruction words include seven bits to specify an order, and 16 bits which define a constant to be used in the execution of the order. These 16 bits would ordinarily be insufficient to represent a 23-bit mask to be used in the execution of the order if the mask option is specified. However, by my invention a full 23-bit mask is specified in only ten of the 16 bits in the constant portion of any instruction word. These ten bits are divided into two groups of five bits each. The first five bits represent the first position in the mask word which contains a 1, and the second five bits represent the last position in the mask word which contains a binary 1. A translator is provided which is controlled by the ten bits to derive a 23-bit mask word which is used in the execution of the order. Not only is it not necessary to provide a previous order to transfer the mask word from the memory store to the masking register, but in addition six bits in the constant portion of the instruction word remain which may be used in the execution of the specified order in the ordinary manner.

Bits 15–0 comprise the constant in each instruction word. (In the drawing and subsequent description the bits of the various words are specified with the more significant or higher order bit first. Thus bits 22–0 specify the bits 22 through 0 in descending order of significance.) In the invention the bits in positions 15–11 are used to represent the last bit in the mask to be derived which is a binary 1, and bits 10–6 represent the first bit in the mask to be derived which is a binary 1. Bits 5–0 in the constant part of the instruction word define a shortened constant, to be used in the ordinary manner during the execution of the order. For example, consider an instruction word whose constant is 1010100011011010. The first first five bits (the most significant ones) represent the number 21. The next five bits represent the number 3. Thus the translator translates these ten bits into the mask word 01111111111111111111000. (The bits in all data, instruction and mask words are numbered 22–0. Consequently, the number 21 specifies the next to the last bit in a 23-bit word, and the number 3 specifies the fourth bit in the word.) The translator derives the mask word and places it in the masking register. Bits 22–16 of the instruction word specify the order. The order, for example, might be to add the contents of one register to the first six bits in the constant of the instruction word and, after masking, to store the result in a second register. In executing the order, the number 011010, comprising the six least significant bits of the instruction word, is added to the contents of the first register, and the sum, after being masked by the mask defined by bits 15–6 of the instruction word, is stored in the second register specified in the order. In the prior art, it has been necessary to provide a first order to place the mask word in the masking register, and a second order to transfer the word in the first register, after the adding and masking operations, to the second register. It is true that in the prior art the constant which may be specified in the second order may comprise 16 bits rather than only six. However, it has been found that in many applications, the constant may be specified in six or fewer bits. Thus in these many situations, the use of the instruction of the invention saves one step yet allows all of the desired operations to be carried out. Furthermore, the normal orders are still available and if a constant of 16 bits is required in the execution of an order, the old order may be used, when preceded by an order to place a mask in the masking register if the mask option is required. But when the constant to be used in the execution of the order is six or fewer bits the new order may be used rather than the old, in which case it need not be preceded by an order which sets up the mask in the masking register.

It is a feature of this invention to include in a data processor circuitry for translating some of the bits in the constant portion of an instruction word into a mask word having a number of bits even greater than the number of bits in the constant portion of the instruction word.

It is another feature of this invention to control a data processor to execute orders having a mask option by using the translated mask word in the masking operation and by using the remaining bits in the constant portion of the instruction word as the constant of the order.

Figure 2:
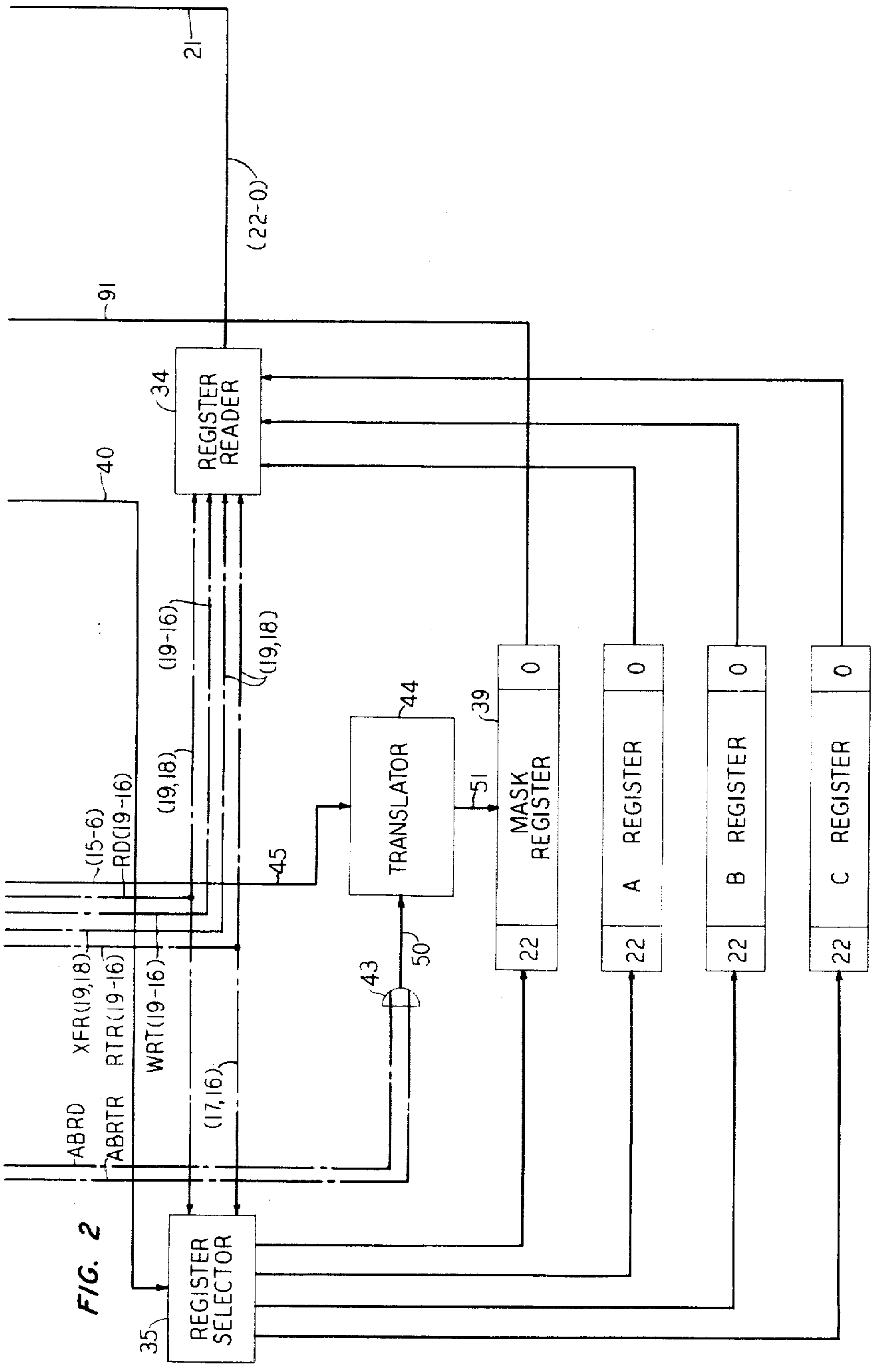
Figure 3:
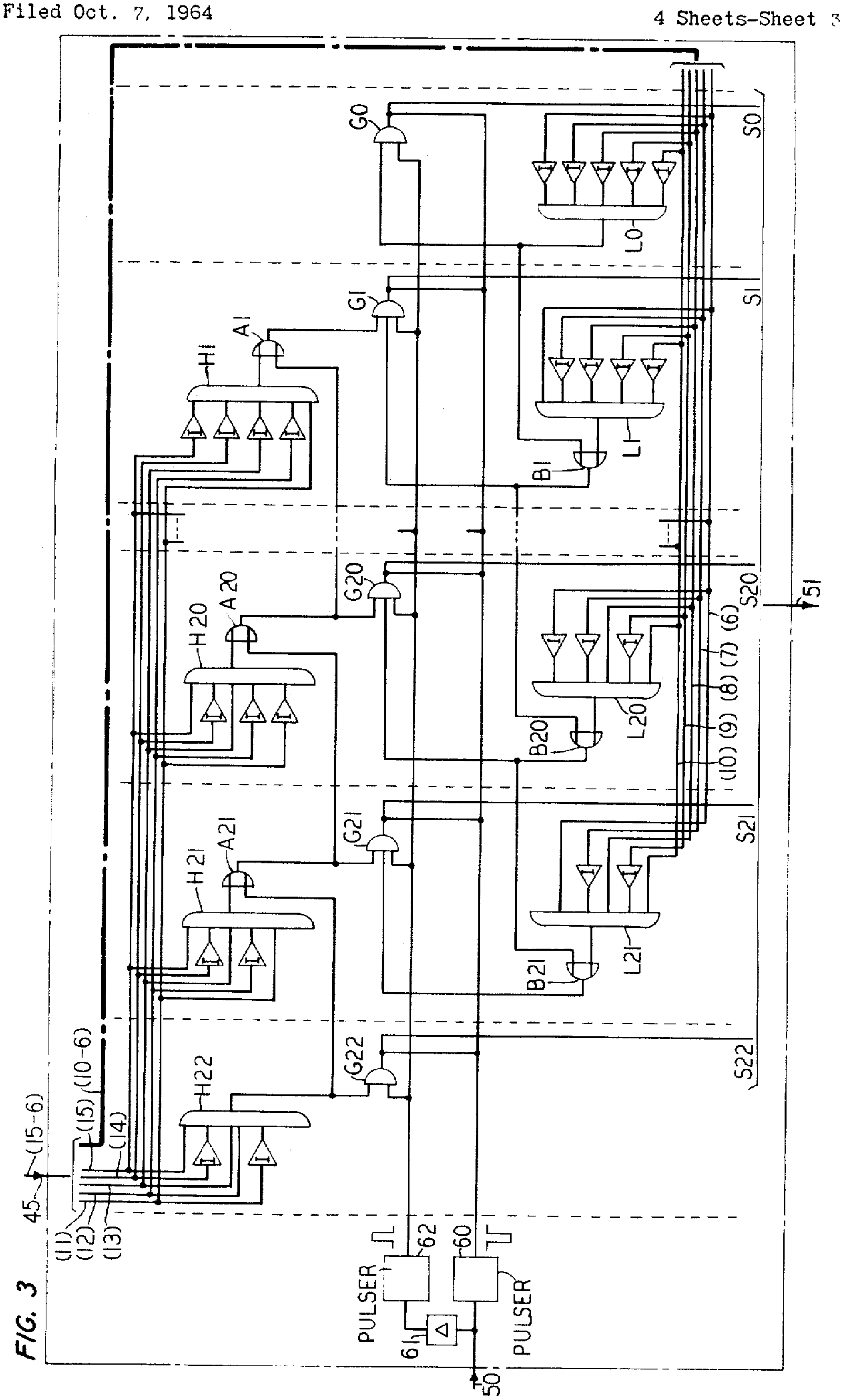

Further objects, features and advantages of the invention will become apparent upon consideration of the following detailed description in conjunction with the drawing in which:

FIGS. 1 and 2 (with FIG. 1 placed on top of FIG. 2) are a schematic representation of a data processor illustrative of one embodiment of my invention;

FIG. 3 is a detailed schematic of illustrative circuitry which may comprise the translator 44 shown in FIG. 2; and FIG. 4 is a table indicating the coding of various orders in the illustrative embodiment of the invention.

In FIGS. 1 and 2 there is shown one illustrative embodiment of my invention incorporated in a data processor depicted in simplified form. Thus, various elements of data processors well known in the art but not necessary for an understanding of my invention, such as timing circuitry, have been omitted. Further, as various of the functional blocks depicted perform recognized operations, the details of such circuitry have not been shown. A specific data processor in which my invention may advantageously be employed is disclosed in Doblmaier et al. application Ser. No. 334,875, filed Dec. 31, 1963 and such disclosure is hereby incorporated herein. In the Doblmaier et al. application "product" masking is described as well as "insertion" masking, the latter type of masking being provided in the illustrative embodiment of the invention. The present invention is equally applicable however to systems in which the product masking option is provided.

Turning now to FIGS. 1 and 2 there will first be explained the operation of the data processor utilizing the normal orders and then the operation of the circuitry utilizing the abbreviated mask orders in accordance with my invention.

In the embodiment of my invention depicted in FIGS. 1 and 2, all data words and all instruction words are 23 bits in length. Data words and instruction words are stored in memory store 10. The memory store has $2^{16}$ word locations. Accordingly, a particular word in the store is identified by a 16-bit address. The system includes three addressing circuits, order read circuit 11, data read circuit 12, and write address circuit 13. When an address is sent to the order read circuit on cable 14, the word in the respective location of the memory store is transmitted along cable 15 to instruction register 16. When an address is transmitted to data read circuit 12 on cable 17, the word in the respective memory location is transmitted from the memory store over cable 18 to masking circuit 19. When an address is sent to write address circuit 13 on cable 20, the word on write bus 9 is written into the respective memory location in memory store 10.

An instruction word appearing in instruction register 16 is decoded in decoder-distributor 30. The decoder-distributor applies bits 15–0 to cable 31 on all orders. Bits 15–0 comprise the constant in any instruction word. The system includes a group of order cables, RD, WRT, XFR, and RTR, each shown by a dotted line. The decoder-distributor applies various bits to one of these four order cables in accordance with the order coding shown in FIG. 4. The upper six rows of FIG. 4 represent the normal orders which may be executed in the system. Bits 22–16 are the bits which specify the order and the various registers which are to be used in its execution. The order itself is determined by either bits 22 and 21, or bits 22–20. The bits which determine the particular type of order to be executed are outlined in heavy lines in FIG. 4. Thus a read order is specified by the code 00 in bits 22 and 21. A write order is represented by the bits 010 in bits 22–20, and a transfer order is specified by the bits 011 in positions 22–20. Finally, a register-to-register order is carried out when the combination 10 appears in positions 22 and 21. Only one of the four order cables is energized at any time, depending on the order to be executed.

The numbers in parentheses in FIGS. 1 and 2 represent the bits whose values are transmitted along the order cables. Certain of the cables in FIGS. 1 and 2 which are not order cables also have numbers within parentheses associated with them. These numbers similarly indicate the bits which are transmitted along these cables. For example, bits 15–0 of the 23 bits in index adder 32 are transmitted along cable 33 to data read circuit 12 and write address circuit 13.

Some branches of the order cables are connected to various blocks of equipment which do not require specific bits for their operations. For example, order cable RD is connected to data read circuit 12 without one of bits 20–16 which appear on this cable being transmitted to the data read circuit. The reason for this is that when a read (RD) order is executed the data read circuit must operate. However, the data read circuit operates without requiring any particular bits contained in the instruction. Thus when a read order is executed data read circuit 12 and index adder 32 both operate because they are enabled by order cable RD. The five bits which appear on the order cable are directed to masking circuit 19, register reader 34 and register selector 35 as shown in FIG. 1. These three units require, in addition to an enabling signal, specific bit values for their proper operations.

Before the four orders which may be executed are discussed, certain remarks might be made concerning the individual units in the system. The particular instruction word which is placed in instruction register 16 is controlled by program address register 36. This register contains 16 positions. The program address register successively applies 16-bit addresses to cable 14, connected to order read circuit 11. The instruction words in the respective memory locations in store 10 are successively transmitted to instruction register 16 via cable 15. The address in program address register 36 is incremented after every instruction by increment circuit 67. The instruction words which are transmitted to instruction register 16 are derived normally from successively addressed memory locations. However, it is possible to transfer to an instruction word which is not in sequence. When a 16-bit word appears on cable 37 and order cable XFR enables the program address register, the 16-bit word on cable 37 is stored in the program address register. This address is then transmitted via cable 14 to order read circuit 11, and it is this address in the program address register which is now incremented to derive the addresses of succeeding instructions.

Register reader 34 (FIG. 2) is enabled on all four orders and reads the 23-bit word stored in one of the A, B and C registers. Bits 22–0 are transmitted along cable 21 to index adder 32 and along write bus 9 to memory store 10. If an address has been sent along cable 20 to write address circuit 13 the 23-bit word on the write bus is written into the memory store. If instead index adder 32 is enabled, the 23-bit word is added in the index adder to the 16 bits in the constant of the instruction appearing on cable 31. The full 23-bit sum derived by the index adder is applied to cable 38 if the index adder is enabled by one of the four order cables as described below. If the index adder is enabled by any one of the other three order cables, instead of the full 23-bit word being applied to cable 38, only the first 16 bits of it are applied to cable 33.

A 23-bit word is delivered to masking circuit 19 via either cable 18 or cable 38. If bit 20 is a 1 on either a read (RD) order or a register-to-register (RTR) order, the 23-bit word delivered to the masking circuit is masked by the mask word contained in mask register 39. The resulting masked word appears on cable 40 and is delivered to register selector 35. Although cable 40 is shown as carrying 23 bits, the label is to be interpreted as a maximum value, for if the mask contains fewer than 23 1's there will be fewer than 23 bits transmitted to the register selector. If bit 20 in the order being executed is a 0, indicating that the mask option is not required, the 23-bit word on either cable 18 or 38 is transmitted directly through the masking circuit to the register selector. The register selector directs the word on cable 40 to either the mask register or one of the A, B and C registers, depending on the value of bits 17 and 16 on the read order cable or the register-to-register order cable.

The operation of the data processor of FIGS. 1 and 2 may be best understood by considering each of the four possible orders separately. As shown in FIG. 4 a read order is specified when bits 22 and 21 are both 0's. This is shown symbolically by the representation $\overline{22}$, $\overline{21}$ in decoder-distributor 30; when both bits 22 and 21 are 0's, quantities $\overline{22}$ and $\overline{21}$ are both 1's, and order cable RD is energized. Bits 20–16 are transmitted along the order cable to the various units requiring them. Bit 20 is sent to masking circuit 19 and as shown in FIG. 4 controls the masking operation only if it is a 1. Bits 19 and 18 are delivered to register reader 34. These two bits specify one of four registers, the mask register or register A, B or C. There is no connection from the mask register to the register reader, and accordingly if the mask register is specified by bits 19 and 18 the register reader does not operate. If one of registers A, B or C is specified its contents are delivered via cable 21 to index adder 32. The index adder is enabled by the RD order cable and adds the 23-bit word from the specified register to the 16-bit constant in the instruction word which appears on cable 31 on all orders. A 23-bit sum is thus derived in the index adder during this "indexing" step. However, only the first 16 bits of this sum are delivered to cable 33 by the index adder. When the index adder is enabled by the read order cable the index adder does not deliver its contents to the masking circuit via cable 38.

The 16-bit word on cables 33 and 37 has no effect on program address register 36 because this unit is not enabled when a read order is executed. The same 16-bit word has no effect on the write address circuit 13 because this unit is similarly not enabled when a read order is executed. However, data read circuit 12 is enabled by the read order cable. Data read circuit 12 controls the reading of the word from the location in memory store 10 represented by the 16-bit address on cables 33 and 17, and the transmission of the word via cable 18 to the masking circuit. If bit 20 is a 1 the word is masked by the contents of mask register 39 and the resulting masked word appears on cable 40. If bit 20 on the read order cable is a 0 the word is not masked and the full word in the specified address appears on cable 40. Register selector 35 then directs the word to either the mask register, or one of the A, B and C registers. Which of these four registers is selected depends on the values of bits 17 and 16 which are transmitted along the read order cable to the register selector.

It will be noted that in FIG. 4 bits 19 and 18 in the instruction word identify an "index register." These bits actually identify register A, B or C, or the mask register if the register reader is not to operate. The label "index register" is used because the contents of the specified register are delivered to the index adder to be added to the constant of the instruction word during the indexing step. Bits 17 and 16 are labeled "destination register" because these bits identify that one of the four registers which is the destination of the word read from the memory store.

Whenever the mask option is required on either a normal read order or, as will be seen below, a normal register-to-register order, it is first necessary to execute another read order. The mask which is used in the execution of the subsequent order must first be stored in the mask register. A read order is required to read the mask from store 10 into the mask register. The instruction word would include 0's in bits 22 and 21 to identify the read order. Bit 20 would also be a 0 because if the complete mask word is in the store it should not be masked when reading it into the register selector. Bits 17 and 16 would control the register selector to direct the mask to the mask register. Bits 19 and 18 would identify that one of registers A, B and C whose contents when added to the constant of the instruction would result in the address of the location in the store which contains the mask word.

It should be noted that the execution of a read order has been described without reference to the particular times of operation of the various units involved. Only relative times of operation have been described. For example, register reader 34 operates prior to register selector 35. The timing of the various units in the system may be controlled by a timing network, timing networks being well known in the prior art. FIGS. 1 and 2 have also been simplified in other respects to show only those units required for an understanding of the invention. For example, memory store 10 may include input/output equipment such as that described in my copending application Ser. No. 402,090, filed Oct. 7, 1964. Similarly, most systems are capable of executing more than four basic orders. However, for an understanding of the invention it is sufficient to show the simplified system of FIGS. 1 and 2.

Referring to FIG. 4 it is seen that the second order, a write order, is executed when bits 22–20 contain the code 010. Order cable WRT is energized at this time. This is shown symbolically by the expression $\overline{22}$, 21, $\overline{20}$ within decoder-distributor 30. It should be noted that the mask option is not available on write orders. Bit 20 which controls the operation of masking circuit 19 on read and register-to-register orders is used instead to distinguish between write and transfer orders, the mask option not being available on either of these two orders. The bits which appear on order cable WRT are 19–16.

On a write order register reader 34 operates twice in succession. First, bits 19 and 18 direct the register reader to read out the contents of one of registers A, B and C. The 23-bit word is directed to both index adder 32 and memory store 10. The word directed to memory store 10 on write bus 9 has no effect on this circuit because write address circuit 13 is not enabled at this time. It is true that the WRT order cable enables this circuit when a write order is executed, but the write address circuit is not enabled until register reader 34 operates a second time in the execution of the order. Index adder 32 is enabled at this time however, and the word read by register reader 34 is added to the constant of the instruction word. Only the least significant 16 bits of the sum are directed to cable 33. The full 23-bit word derived in the index adder is not directed to cable 38 when the index adder is enabled by order cable WRT. The 16 bits on cable 37 have no effect on program address register 36 which is not enabled during the execution of a write order. Similarly, data read circuit 12 is not affected because it is not enabled by order cable WRT. The 16-bit word on cable 20 however is stored in write address circuit 13. This circuit is enabled by order cable WRT at a time during the execution of a write order after index adder 32 has completed its operation. The 16 bits stored in write address circuit 13 represent the address in the memory store into which the word next to be derived is written.

Register reader 34 then operates a second time and reads out the 23-bit word in the particular one of the A, B and C registers represented by bits 17 and 18. The 23-bit word is directed again to both memory store 10 and index adder 32. The index adder is not enabled at this time however by order cable WRT, the index adder being enabled only during the first operation of register reader 34. The 23-bit word on write bus 9 is written into memory store 10 at the location specified by the address stored in write address circuit 13.

As seen in FIG. 4 on a write order bits 19 and 18 specify an "index register," and bits 17 and 16 specify a "source register." The contents of the index register specified are first added to the constant of the instruction word to determine the address in the memory store into which the word is to be written. Bits 17 and 16 are then used to identify the register which is the source of the 23-bit word to be written into the memory store in the location previously determined. Bits 19 and 18 may specify mask register 39 in which case register reader 34 does not operate, and the address transmitted to write address circuit 13 via cable 33 is merely the constant of the instruction word. Bits 17 and 16 may specify only one of registers A, B and C. Mask register 39 may not be identified by bits 17 and 16 on a write order because if they are register reader 34 does not operate and no bits appear on the write bus to be written into the memory store at the previously determined address. In the system of FIGS. 1 and 2 masking is not available on write orders. The mask option may be provided in other systems for write orders however, and as will become apparent below the principles of the invention are applicable to such systems as well as to those similar to that of FIGS. 1 and 2.

The third order, a transfer, is represented by the sequence 011 in bits 22–20 of the instruction word. Again, the mask option is not available on a transfer order and bit 20 is used to distinguish between write and transfer orders. Bits 19 and 18 specify an index register, and bits 17 and 16 are not used. Order cable XFR is enabled and bits 19 and 18 are transmitted along the cable to register reader 34. These bits may specify mask register 39, in which case register reader 34 does not operate, or one of the A, B and C registers. The 23-bit word on cable 21 is directed to both memory store 10 and index adder 32. Write address circuit 13 is not enabled on a transfer order and the bits on the write bus have no effect on the memory store. The index adder is enabled however and the word read by register reader 34 is added to the constant of the instruction word in the index adder. The sum is not applied to cable 38, and instead only the first 16 bits of it are applied to cables 33 and 37. The bits on cable 33 have no effect on either data read circuit 12 or write address circuit 13 which are not enabled when a transfer order is executed. However, the 16 bits on cable 37 are written into program address register 36 which is enabled when a transfer order is executed. These 16 bits are directed along cable 14 to order read circuit 11, and the next instruction word transmitted from memory store 10 to instruction register 16 via cable 15 is determined by this 16-bit address. The address is stored in program address register 36 and it is this address which is incremented to derive subsequent addresses for instruction words until another transfer order is executed. The instruction word controlling a transfer order has no bits contained in positions 17 and 16, these positions normally identifying either a destination register or a source register. A destination register must be identified when information is to be written into either the mask register or one of registers A, B and C. A source register must be identified on a write order when the word in one of registers A, B and C is to be written into memory store 10.

Neither of these situations exists when a transfer order is executed. Only bits 19 and 18 are required; they specify an index register. Indexing, in general, is the process of modifying (by adding) the constant of an instruction word with data previously stored in one of registers A, B and C. Indexing is available on all orders, and if it is not required bits 19 and 18 merely specify the mask register in which case register reader 34 does not operate.

The fourth type of order which may be executed in the system is a register-to-register order. The order is identified by the code 10 in bits 22 and 21. As in the read order the mask option is available and is controlled by the value of bit 20. Register reader 34 reads the 23 bits in the register specified by bits 19 and 18. The word is directed to the index adder where it is added to the constant of the instruction word. When a register-to-register order is executed, order cable RTR controls index adder 32 to supply the 23-bit sum on cable 38, rather than the first 16 bits of the sum of cable 33. The 23-bit sum passes through masking circuit 19 and is masked by the contents of mask register 39 only if the value of bit 20 in the instruction word is a 1. The output of masking circuit 19 is directed to register selector 35 which then directs the word into either mask register 39 or one of registers A, B and C, depending upon the values of bits 16 and 17 which in a register-to-register order specify a destination register. The purpose of the register-to-register order is to allow the transfer of the 23-bit word stored in register A, B or C to either mask register 39 or another one of registers A, B and C. In the course of the transfer the word may be modified in one of two ways. The original contents of the index register may be modified if the constant of the instruction word is anything other than the number zero. Also, the original contents of the index register may be modified if the mask option is ordered. (It should be noted that if bits 19 and 18 specify mask register 39 the word transmitted to the masking circuit via cable 38 is merely the 16-bit constant of the instruction word.) Ordinarily a 23-bit word is transmitted via cable 38 to the masking circuit, but if bits 19 and 18 specify the mask register the register reader does not operate, and only the 16 bits in the constant part of the instruction word are transmitted through the index adder and masking circuit to the specified destination register. These 16 bits may be masked by the contents of the first 16 bits of mask register 39 if the mask option is ordered. The net effect is that at most a 16-bit word is stored in either mask register 39 or one of registers A, B and C. If the word is stored in the mask register and subsequently used in a masking operation, stages 22–16 in the mask register control respective stages in the masking circuit to allow respective bits in the incoming word to pass through to the register selector, i.e., bits 22–16 in the mask are1's.

The remarks above concerning the read order are equally applicable to the normal register-to-register order. If the mask option is required in the execution of the order it is first necessary to provide a mask in mask register 39. A separate read order must first be executed to read a 23-bit mask from memory store 10 into mask register 39. A principal object of the invention is to provide means for allowing instruction words for read, register-to-register, and similar orders to include, within the 16-bit constant portion of the word, information determining a 23-bit mask which may be used in the execution of the order, thus not requiring the prior execution of a read order to store the required mask in the mask register.

Order cables ABRD and ABRTR are energized when the abbreviated mask instructions of the invention are executed. The coding for bits 22–16 of the instruction words required for the two abbreviated mask orders are shown in the last two rows of FIG. 4. Consider first the abbreviated mask-register-to-register order which is controlled by order cable ABRTR. Bits 22–20 contain the code 111 when this order is to be executed. It will be noted that order cable ABRTR is connected to order cable RTR, bits 20–16 which appear on order cable ABRTR therefore appearing on order cable RTR when the abbreviated mask-register-to-register order is executed. Bits 20–16 are directed to the same units to which they are directed when the regular register-to-register order is executed. Similarly, the same units which are enabled by order cable RTR are enabled when the new order is executed. Bits 19 and 18 again control the register reader to read the word from one of registers A, B and C and direct it to the index adder. Bits 17 and 16 again specify which of the four registers is the destination of the final word to be stored.

The full 16-bit constant of the instruction word is no longer directed to the index adder. Cable 45 carries bits 15–6 of the constant to translator 44. Gate 42 is normally enabled, and when one of the four normal orders is executed the 16-bit constant is transmitted through this gate to the index adder as required. When the abbreviated mask-register-to-register order is executed however order cable ABRTR operates OR gate 70. The operation of this OR gate inhibits the operation of gate 42 and instead enables the operation of gate 41. Bits 15–0 in the constant of the instruction word are no longer transmitted through gate 42 to the index adder. Cable 46 carries only bits 5–0 of the 16-bit constant. When order cable ABRTR is enabled only the first six bits of the constant in the instruction word are transmitted to the index adder.

Bits 15–6 in the constant are transmitted via cable 45 to translator 44. Actually, when any order is executed bits 15–6 in the constant of the instruction word are transmitted to the translator. However, these bits have no effect on the translator which is enabled only when the two abbreviated mask orders are executed. When order cable ABRTR is energized, OR gate 43 operates and translator 44 is enabled. The translator operates on bits 15–6 of the constant and from these ten bits derives a full 23-bit mask. The translator then stores the mask in mask register 39. It is this mask which is used in the execution of the order.

During the execution of the normal register-to-register order, the word read by register reader 34 is added to the 16-bit constant of the instruction word in the index adder. Bits 15–6 of the constant however now specify the mask to be used in the execution of the order. Only bits 5–0 remain to represent data to be added to the original register word in the index adder. These bits are transmitted through gate 41 to the index adder. Although the effective constant as far as the index adder is concerned is now only six bits, rather than sixteen, in many applications six bits are sufficient to represent the constant to be added to the register word read by register reader 34 and transmitted to the index adder.

The sequence of operations of the various units of the system when an abbreviated mask-register-to-register order is executed is as follows. When bits 22–20 contain the code 111 order cable ABRTR is enabled, and bits 20–16 are applied to respective conductors in the cable. It should be noted that bit 20 is used as one of the bits in the code to specify the order in both write and transfer instructions, and thus neither order cable WRT nor order cable XFR carries bit 20. Bit 20 is also used in the execution of normal read and register-to-register orders to determine whether the mask option is required. When the abbreviated mask-register-to-register order is executed the mask option is required. Consequently, bit 20 must be delivered to the masking circuit, as well as being used to identify the order itself. Bit 20 is a 1 when the abbreviated mask-register-to-register order is specified, and thus a conductor is included in order cable ABRTR for transmitting bit 20 to order cable RTR. This order cable includes a conductor for carrying bit 20 to the masking circuit since the mask option is available on the normal register-to-register order.

Bits 19 and 18 are transmitted from order cable ABRTR along order cable RTR to register reader 34. The word in register A, B or C is read out and directed to the index adder. If mask register 39 is specified by bits 19 and 18, register reader 34 does not operate. The word transmitted to index adder 32 is added to bits 5–0 in the constant part of the instruction word. Order cable ABRTR operates OR gate 70 which enables gate 41 to allow bits 5–0 to be transmitted through it to the index adder. When gate 70 operates, gate 42 is inhibited and bits 15–0 of the constant are no longer transmitted to the index adder via cable 31. The index adder is enabled in the same manner as it is in a register-to-register order and the 23-bit word sum derived by the index adder is transmitted along cable 38 to the masking circuit.

While register reader 34 and index adder 32 have been operating, translator 44 has been operating. Order cable ABRTR operates OR gate 43 which enables translator 44. The translator operates on bits 15–6 of the constant in the instruction word and develops a 23-bit mask. This mask is directed to mask register 39. When the 23-bit word appears on cable 38, masking circuit 19 operates. Bit 20 which appears on order cables ABRTR and RTR is a 1 and controls the operation of the masking circuit. The masking circuit as usual uses the mask stored in register 39 in the masking operation. The masked word is then directed via cable 40 to register selector 35. Bits 17 and 16 on order cables ABRTR and RTR direct the register selector to store the word in one of the four destination registers.

Similar remarks apply to the abbreviated mask-read order. The code for this order is 110 in bits 22–20 of the instruction word. Order cable ABRD is enabled at this time. To execute the normal read order, order cable RD requires bits 20–16. Accordingly, order cable ABRD is directly connected to old order cable RD. It will be noted that in order for the masking circuit to operate bit 20 must be a 1. But in the code for the abbreviated mask-read order bit 20 is a 0. For this reason inverter 48 is provided. While bits 19–16 are transmitted directly to order cable RD, bit 20 is first inverted so that this bit will appear in order cable RD as a 1.

Bits 19 and 18 which appear on order cables ABRD and RD control the operation of register reader 34. The register reader either reads the word out of register A, B or C or does not operate if mask register 39 is specified. The word read out is directed to index adder 32. Order cable ABRD is the second input of OR gate 70 and when the abbreviated mask-read order is executed the OR gate operates. Gate 42 is inhibited at this time and gate 41 is enabled. Consequently, only bits 5–0 of the constant in the instruction word are transmitted via cable 46 to the index adder. Bits 15–0 are not transmitted via cable 31 to the index adder. Bits 5–0 are added to the word read by register reader 34. As in the execution of the normal read order the index adder supplies only bits 15–0 of the sum to cable 33. The 23-bit sum does not appear on cable 38. Program address register 36 is not enabled on a read order and consequently the bits on cable 37 have no effect on this unit. The 16-bit address on cable 33 is directed to data read circuit 12 and write address circuit 13. The write address circuit however is not enabled on any read order. Data read circuit 12 is enabled since order cable ABRD is energized and is tied to order cable RD. Data read circuit 12 controls the reading of the word in the location of memory store 10 specified by the 16-bit address supplied by index adder 32 to cable 33. The word read is transmitted via cable 18 to masking circuit 19.

During this time translator 44 has operated as it does during the execution of the abbreviated mask-register-to-register order. Order cable ABRD is enabled and operates OR gate 43. Translator 44 translates bits 15–6 of the constant in the instruction word which appear on cable 45 into a 23-bit mask which is directed to mask register 39. Bit 20 on order cable RD is a 1 due to the inverting action of inverter 48. The masking circuit operates and masks the word read from memory store 10 by the mask developed and stored in register 39. The resulting masked word is directed via cable 40 to register selector 35. Bits 17 and 18 in order cable RD control the register selector to direct the masked word into either mask register 39 or one of registers A, B and C.

It is seen that the two abbreviated mask orders which are included in the system are based on two of the normal orders. The two abbreviated mask instruction order cables may be tied to the two respective normal order cables because the same units which operate during the execution of the normal orders operate during the execution of the abbreviated mask orders, and the same bits are required for enabling them and for specifying particular information, e.g., the identification of an index register. It is only necessary to enable translator 44 during the execution of either of the abbreviated mask orders in order that the translator develop a mask from bits 15–6 of the constant in the instruction word, and to inhibit the transmission of all 16 bits in the constant to the index adder since ten of the 16 bits now represent a mask and only the first six bits of the constant represent data to be used in the indexing operation. Thus the full 16-bit constant must be blocked from the index adder, and instead another path must be provided for operating only when one of the two abbreviated mask orders is executed to transmit bits 5–0 of the constant to the index adder. A minimum of circuitry is required to implement the abbreviated mask orders because each of the two order cables is tied to a respective one of the normal read and register-to-register order cables. It is also necessary to provide an inverter to invert the 0 in bit 20 on the abbreviated mask-read order to a 1 for controlling the operation of masking circuit 19.

The principles of the invention are applicable wherever a mask option is available on any order. For example, in the system shown a mask option is not available on a write order. A word to be written into memory store 10 is read out of one of registers A, B and C, and is transmitted directly via the write bus to the memory store. In some systems however the masking circuit may be capable of masking the word read before it is applied to the write bus. In these systems it is possible to provide an abbreviated mask-write instruction in a similar manner. The new order cable would operate the same units but the entire constant would not be transmitted to the index adder. Only part of it would be transmitted to the index adder, and the remainder would be used to derive the mask to be used by the masking circuit. The abbreviated mask instructions are highly advantageous for they allow an order to be executed with the mask option without first having to read a mask from the memory store into the mask register.

While registers A, B and C have been shown apart from memory store 10, it should be noted that a single memory in a system may be used rather than separate registers and a memory store. In such a case the registers A, B and C would merely be three locations in the memory.

Translator 44 is shown in FIG. 2 only in block diagram form. The inputs to the translator are of two types. Bits 15–6 appear on cable 45 when any order is executed. However, the translator operates only when an enabling pulse appears on conductor 50. The 23-bit mask developed in the translator from the ten bits 15–6 are transmitted via cable 51 to mask register 39. A particular translator which is suitable for use in FIG. 2 is shown in detail in FIG. 3.

Translator 44 is comprised of twenty-three similar stages. When conductor 50 is first energized, pulser 60 operates and applies a negative pulse to the twenty-three conductors S0–S22. These conductors are extended to respective stages of mask register 39, and the negative pulse on each of these conductors writes a 0 into the respective register stage. The pulse on conductor 50 is transmitted through delay 61 to operate pulser 62 a short time after the operation of pulser 60. Pulser 62 applies a positive pulse to one of the inputs of each of the twenty-three gates G0–G22. If all inputs to one or more of these gates are energized, the gates apply positive pulses to the respective ones of conductors S0–S22. Positive pulses appear on those of conductors S0–S22 which are connected to respective stages of the mask register into which are to be written binary 1's. All of the register stages have 0's initially written into them, and those which are to contain 1's have 1's written into them after the register is first reset. Depending on the values of bits 15–6 on cable 45, a particular sequence of successive gates of the twenty-three gates G0–G22 operate when pulser 62 applies a positive pulse to one input of each of the gates.

Each of the twenty-three stages of the translator, except the first, includes a respective one of the AND gates H1–H22. Each AND gate operates when bits 15–11 represent the number of the respective stage. All five inputs to a particular gate must be high in potential for the gate to operate. Binary 1's are represented by positive potentials, and binary 0's are represented by negative potentials. Accordingly, various inverters I are associated with each gate to invert a 0 in one of bits 15–11 to a 1 at the respective input of the gate. (The many inverters shown individually in this circuit could be reduced to 10, one for each of the bits 15–6.)

For example, consider gate H20. The binary numbering representing the decimal number 20 is 10100. The conductor carrying bit 15 is connected directly to one input of gate H20. Similar remarks apply to the conductor carrying bit 13. The other three conductors, on which bits 11, 12 and 14 are transmitted, are connected to respective inverters associated with gate H20. Thus only when bits 15–11 represent the number 20 does gate H20 operate because only at this time are its five inputs energized. Similar remarks apply to gates H1–H19, H21 and H22. Only one of the AND gates operates at any time, depending on the number represented by bits 15–11. These bits identify the highest numbered bit in the mask to be developed which contains a binary 1. That one of the gates H1–H22 which operates is the one whose respective conductor S1–S22 is the highest numbered conductor which is to be pulsed when pulser 62 operates.

In a similar manner one of the gates L0–L21 is provided for each stage, except the last. The five conductors on which bits 10–6 of the constant of the instruction word are transmitted are connected either directly or through inverters to the five inputs of each of these gates. Only one of the gates operates depending on the binary number represented by bits 10–6. For example, if the binary number is 00000, positive inputs are applied to the five inputs of gate L0 and only this gate operates. Bits 10–6 represent the binary number of the lowest numbered bit in the mask to be developed which is to contain a binary 1. Thus, if gate L1 operates the second bit in the mask is a 1. The first bit is a 0, and the bits more significant than the second have values determined by the particular one of gates H1–H22 which operates. For example, suppose the binary number appearing in bits 15–11 is 10101, and the binary number in bits 10–6 is 00001. Of gates H1–H22 only gate H21 operates. Of gates L0–L21 only gate L1 operates. Thus, all bits in the mask between and including those in positions 1 and 21 are 1's. Bits 0 and 22 are the only ones which are binary 0's.

Each of the stages except the first and last includes one of OR gates A1–A21 and one of OR gates B1–B21. Consider stage 20. Gate G20 has three inputs, one of which is connected to the output of pulser 62. The other two inputs are connected to respective outputs of gates A20 and B20. If both of gates A20 and B20 operate, gate G20 applies a positive pulse to conductor S20 when pulser 62 operates. If only one of gates A20 and B20, or neither, operates, conductor S20 is not pulsed and a 0 remains in stage 20 of the mask register.

Each of OR gates A1–A21 has two inputs. One of these is the output of the respective one of gates H1–H21. The other is the output of the OR gate of the adjacent stage on the left. The purpose of these connections is to insure that whenever one of gates H1–H22 operates, one of the inputs of the respective gate G1–G22 is energized, as is one of the inputs of each of the lower numbered gates G1–G22. For example, suppose that AND gate H21 operates. OR gate A21 operates and energizes one of the inputs of gate G21. The output of OR gate A21 is connected to one of the inputs of OR gate A20, and this gate operates even though its respective gate H20 does not. Thus, one of the inputs of gate G20 is similarly enabled. The output of gate H20 is connected to one of the inputs of OR gate A19 (not shown) and this OR gate similarly operates and enables one of the inputs of gate G19 (not shown). Similarly, all of OR gates A1–A18 operate and one of the inputs of each of gates G1–G18 is enabled. Thus when gate H21 operates one of the inputs of each of gates G1–G21 is enabled. Only gate G22 is not enabled.

A similar scheme is provided for AND gates L0–L21 and OR gates B1–B21. Whenever one of the AND gates operates, its associated OR gate and all of the higher numbered OR gates operate to enable the respective inputs of gates G0–G21.

Thus for any of the values 1–22 represented by bits 15–11 one of the inputs of the respective one of gates G1–G22 is enabled, as well as an input of each lower numbered gate. For any of the values 0–21 represented by bits 10–6 one of the inputs of the respective gate G0–G21 is enabled as is an input of each higher numbered gate. Some of gates G1–G21 have no inputs enabled, some have only one input enabled, and some have two inputs enabled. It is only the latter group of gates which operate when a pulse is applied by pulser 62 to the remaining input of each gate.

The first stage is not provided with a gate equivalent to gates H1–H22. If the highest numbered bit in the mask to contain a 1 is the first, the number 00000 will appear in both groups of bits 15–11 and 10–6. (If the highest numbered bit in the mask to contain a 1 is the first, the lowest bit in the mask to contain a 1 must of necessity be the first; otherwise, the entire word to be read from the memory or to be transferred from one register to another would be blocked by the masking circuit.) AND gate G0 has only two inputs, one connected to pulser 62, and one connected to the output of gate L0. A third input from a gate equivalent to gates H1–H22 is not required because when only the first bit in the mask is to be a 1, the mask may be determined by AND gate L0 alone. Nor is an OR gate B0 required for the first stage. There is no gate which is numbered lower than gate L0 which when operated would operate OR gate B0. OR gate B0 is not required and the output of gate L0 is connected directly to an input of both gates G0 and B1.

Similarly, stage 22 is not provided with an AND gate L22. If the lowest numbered bit in the mask which contains a 1 is the last, AND gate H22 must of necessity operate, i.e., bits 15–11 must represent the number 22. Were this not the case, the mask would again consist of 23 0's. Nor is an OR gate A22 for stage 22 required because there is no gate numbered higher than AND gate H22.

The operation of the translator may be summarized as follows. One of AND gates H1–H22 operates depending on the value of the number represented by bits 15–11. The operation of this gate controls the enabling of the respective one of gates G1–G22, and the enabling of all lower numbered ones of these gates. The number represented by bits 10–6 controls the operation of one of gates L0–L21. The operation of this gate controls the enabling of the respective one of gates G0–G21, and the enabling of all higher numbered ones of these gates. In effect, two chains are developed, one to the right and one to the left.

The only ones of gates G0–G22 which operate are those associated with stages where the two chains overlap.

It is to be understood that the above-described arrangement is merely illustrative of the principles of the invention. Numerous modifications may be made therein and other arrangements may be devised without departing from the spirit and scope of the invention.

What is claimed is:

1. A data processor comprising a memory store, a plurality of registers, an index adder, an order distributor, means for sequentially transmitting instruction words stored in said memory store to said order distributor, each of said instruction words including an order part and a constant part, means controlled by said order distributor for reading the word stored in one of said registers and for transmitting said register word to said memory store and said index adder, first means for controlling the transmission of the constant part of an instruction word from said order distributor to said index adder, said index adder deriving a word equal to the sum of said constant part and said register word, means responsive to a first order part of an instruction word being contained in said order distributor for writing a word read from another one of said registers by said register reading means at a location in said memory store determined by said sum word, a masking circuit, means responsive to a second order part of an instruction word being contained in said order distributor for reading a word in said memory store at a location determined by said sum word and for transmitting said memory store word to said masking circuit, means responsive to a third order part of an instruction word being contained in said order distributor for transmitting said sum word from said index adder to said masking circuit, a masking register, means controlled by said order distributor for controlling the masking of said sum word and said memory store word transmitted to said masking circuit by the mask word stored in said masking register and for writing the resulting masked word in a selected one of said masking and plurality of registers, second means controlled by fourth and fifth order parts of instruction words being contained in said order distributor for inhibiting the operation of said first means and for transmitting to said index adder a number of bits in the constant part of the instruction word in said order distributor fewer in number than the total number of bits in said constant part, a translator, means for transmitting the remaining bits in said constant part of said instruction word to said translator, and means operative together with said second means responsive to said order distributor for controlling said translator simultaneously to translate all of said remaining bits into a mask word having a number of bits greater than the number of said remaining bits and for transmitting said mask word to said masking register.

2. A data processor comprising a memory store, a plurality of registers, an index adder, an order distributor, means for sequentially transmitting instruction words stored in said memory store to said order distributor, each of said instruction words including an order part and a constant part, means controlled by said order distributor for reading the word stored in one of said registers and for transmitting said register word to said index adder, first means for controlling the transmission of the constant part of an instruction word from said order distributor to said index adder, said index adder deriving a word equal to the sum of said constant part and said register word, a masking circuit, means responsive to said order distributor for reading a word in said memory store at a location determined by said sum word and for transmitting said memory store word to said masking circuit, a masking register, means controlled by said order distributor for controlling the masking of said word transmitted from said memory store to said masking circuit by the mask word stored in said masking register and for writing the resulting masked memory store word in a selected one of said masking and plurality of registers, second means controlled by said order distributor for inhibiting the operation of said first means and for transmitting to said index adder a number of bits in the constant part of the instruction word in said order distributor fewer in number than the total number of bits in said constant part, a translator, means for transmitting the remaining bits in said constant part of said instruction word to said translator, and means operative together with said second means responsive to said order distributor for controlling said translator simultaneously to translate all of said remaining bits into a mask word having a number of bits greater than the number of said remaining bits and for transmitting said mask word to said masking register.

3. A data processor comprising a memory store, a plurality of registers, an index adder, an order distributor, means for sequentially transmitting instruction words stored in said memory store to said order distributor, each of said instruction words including an order part and a constant part, means controlled by said order distributor for reading the word stored in one of said registers and for transmitting said register word to said index adder, first means for controlling the transmission of the constant part of an instruction word from said order distributor to said index adder, said index adder deriving a word equal to the sum of said constant part and said register word, a masking circuit, means responsive to said order distributor for transmitting said sum word from said index adder to said masking circuit, a masking register, means controlled by said order distributor for controlling the masking of said sum word transmitted from said index adder to said masking circuit by the mask word stored in said masking register and for writing the resulting masked sum word in a selected one of said masking and plurality of registers, second means controlled by said order distributor for inhibiting the operation of said first means and for transmitting to said index adder a number of bits in the constant part of the instruction word in said order distributor fewer in number than the total number of bits in said constant part, a translator, means for transmitting the remaining bits in said constant part of said instruction word to said translator, and means operative together with said second means responsive to said order distributor for controlling said translator simultaneously to translate all of said remaining bits into a mask word having a number of bits greater than the number of said remaining bits and for transmitting said mask word to said masking register.

4. A data processor comprising a memory store for storing instruction words and data words all of the same length, said instruction words each including an order part and a constant part, a masking circuit, a masking register, a plurality of registers, an order distributor for operating in accordance with the order part of one of said instruction words, an index adder, a translator, means controlled by said order distributor for reading the word in a specified one of said plurality of registers and for transmitting said word to said index adder, means for transmitting a portion of the constant part of the instruction word in said order distributor to said index adder, said index adder deriving the sum word of said transmitted register word and said portion of said constant part, means controlled by a first order part of an instruction word being contained in said order distributor for transmitting to said masking circuit the word in said memory store at the location specified by said sum word, means controlled by a second order part of an instruction word being contained in said order distributor for transmitting said sum word to said masking circuit, means for transmitting the remaining portion of the constant part of the instruction word in said order distributor to said translator, said translator being responsive to said order distributor for translating simultaneously all of said remaining portion of said constant part into a mask word and for transmitting said mask word to said masking register, means responsive to said order distributor for controlling said masking circuit to mask the sum word and the memory store word transmitted to said masking circuit by said mask word transmitted to said masking register, and means responsive to said order distributor for storing the resulting masked word in a specified one of said masking and said plurality of registers.

5. A data processor comprising a memory store for storing instruction words and data words all of the same length, said instruction words each including an order part and a constant part, a masking circuit, a masking register, a plurality of registers, an order distributor for operating in accordance with the order part of one of said instruction words, an index adder, a translator, means controlled by said order distributor for reading the word in a specified one of said plurality of registers and for transmitting said word to said index adder, means for transmitting a portion of the constant part of the instruction word in said order distributor to said index adder, said index adder deriving the sum of said transmitted register word and said portion of said constant part, means controlled by said order distributor for transmitting the word in said memory store at the location specified by said derived sum to said masking circuit, means for transmitting the remaining portion of the constant part of the instruction word in said order distributor to said translator, said translator being responsive to said order distributor for translating simultaneously all of said remaining portion of said constant part into a mask word and for transmitting said mask word to said masking register, means responsive to said order distributor for controlling said masking circuit to mask the word transmitted from said memory store to said masking circuit by said mask word transmitted to said masking register, and means responsive to said order distributor for storing the resulting masked memory store word in a specified one of said masking and said plurality of registers.

6. A data processor comprising a memory store for storing instruction words and data words all of the same length, said instruction words each including an order part and a constant part, a masking circuit, a masking register, a plurality of registers, an order distributor for operating in accordance with the order part of one of said instruction words, an index adder, a translator, means controlled by said order distributor for reading the word in a specified one of said plurality of registers and for transmitting said word to said index adder, means for transmitting a portion of the constant part of the instruction word in said order distributor to said index adder, said index adder deriving the sum word of said transmitted register word and said portion of said constant part, means controlled by said order distributor for transmitting said sum word to said masking circuit, means for transmitting the remaining portion of the constant part of the instruction word in said order distributor to said translator, said translator being responsive to said order distributor for simultaneously translating all of said remaining portion of said constant part into a mask word and for transmitting said mask word to said masking register, means responsive to said order distributor for controlling said masking circuit to mask the sum word transmitted from said index adder to said masking circuit by said mask word transmitted to said masking register, and means responsive to said order distributor for storing the resulting masked sum word in a specified one of said masking and said plurality of registers.

References Cited

UNITED STATES PATENTS

| | | | |
|---|---|---|---|
| 3,064,239 | 11/1962 | Svigals et al. | 340—172.5 |
| 3,111,648 | 11/1963 | Marsh et al. | 340—172.5 |
| 3,161,763 | 12/1964 | Glaser | 340—172.5 |
| 3,238,508 | 3/1966 | Kelly | 340—172.5 |
| 3,251,037 | 5/1966 | Coil et al. | 340—172.5 |
| 3,274,558 | 9/1966 | Sharp et al. | 340—172.5 |
| 3,277,449 | 10/1966 | Shooman | 340—172.5 |

OTHER REFERENCES

Burns, W. E., et al.: Method for Generating Masking Functions, in IBM Tech. Disc. Bulletin, pages 84–85, December 1962.

ROBERT C. BAILEY, *Primary Examiner.*

J. P. VANDENBURG, *Assistant Examiner.*